July 16, 1957   O. L. VAN STEENIS   2,799,123
METHOD OF MANUFACTURING CATHODE RAY TUBE
Original Filed Oct. 21, 1950
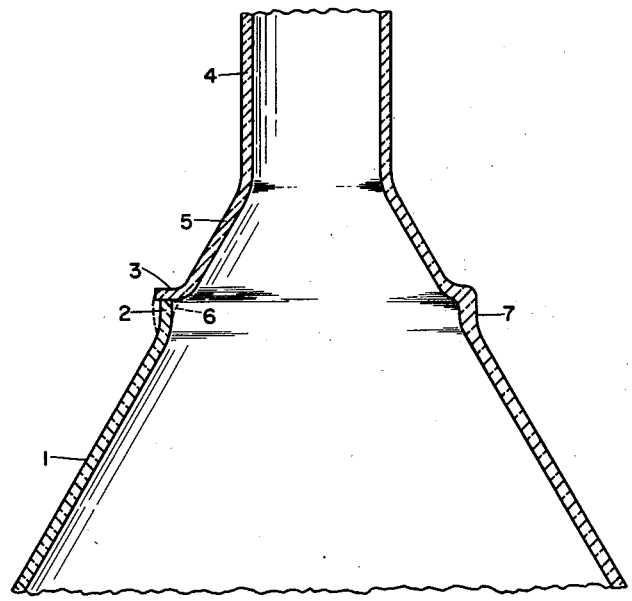
INVENTOR.
OTTO LOUIS VAN STEENIS
BY
AGENT

United States Patent Office 2,799,123
Patented July 16, 1957

2,799,123

METHOD OF MANUFACTURING CATHODE RAY TUBE

Otto Louis van Steenis, Eindhoven, Netherlands, assignor, by mesne assignments, to North American Philips Company, Inc., New York, N. Y., a corporation of Delaware Original application October 21, 1950, Serial No. 191,356. Divided and this application January 15, 1954, Serial No. 406,382

Claims priority, application Netherlands December 1, 1949

2 Claims. (Cl. 49—82)

This invention relates to a method for manufacturing a cathode-ray tube. This application is a division of my application Serial No. 191,356, filed October 21, 1950, now abandoned.

Cathode-ray tubes comprise an envelope generally having a molded glass conical portion to which the face plate is secured and the divergence of which takes into account the deflection of the electron beam, and a neck portion generally cylindrical which is secured to the conical portion at its apex and within which the beam generating elements are contained. For optimum efficiency and smallest size the dimensions of the conical element are generally so established that at the maximum deflection position of the electron beam, the beam passes the internal wall with only a small clearance.

As a rule cathode ray tubes are assembled by sealing together individually made cone and neck pieces. For example, the cone piece is simply cut off at its apex at right angles to the longitudinal axis of the cone, and placed against a radial flange formed on the neck piece. These parts are heat sealed together whilst providing that the cone is not narrowed at the seal due to an internal thickening or seam at the seal. Otherwise the space available for the electron beam may be limited causing the beam to impinge on the glass wall under conditions of full deflection. Due to the normal tendency of the sealing glass to flow inside the cone and thus to thicken this portion, it has hitherto been unfeasible to make such seals by means of automatic machine automatically by mechanical methods.

The internal thickening could be prevented by providing the apex portion of the cone also with a radial flange, but in this case the mould for the cone must consist of two parts, otherwise the cone cannot be removed from the mould. The use of such a mould has the disadvantage that, a seam forms where the halves engage each other and that it is less rigid so that the very high pressure used in moulding may cause deformation.

The aforesaid disadvantages are completely avoided if, in a cathode-ray tube comprising a moulded glass cone sealed at its narrow end to a radial flange of a neck, the apex portion of the cone terminates in a cylindrical part which is sealed at right angles to the radial flange of the neck. Such a seal may be made fully automatic since in a sealing method, in which the narrow end of the cone is placed upwards and the radial flange of the neck is made to engage at right angles the cylindrical part of the cone, the glass of the flange of the neck naturally melts together with that of the cylindrical part of the cone. Since the cylindrical part of the cone constitutes an outwardly directed deviation from the cone, part of the glass may form a thickened portion at the inner side of the cylindrical part without the internal diameter of the cone as such being smaller. Moreover, the cylindrical part occupies a vertical position so that the glass does not tend to flow notably to the inner side of the cone.

In order that the invention may be more clearly understood and readily carried into effect, it will now be described in detail with reference to the accompanying drawing, given by way of example, in which the reference numeral 1 denotes the narrow part of the glass cone, which terminates in a cylindrical part 2 on which the radial flange 3 of the neck 4 is placed at right angles. The inner side of the flaring portion of the neck is located in the plane of the cone. During the sealing operation for example by means of a gas flame, the glass of the flange 3 and that of the cylindrical part 2 melts together such that this flange may form a rim 6 without the internal diameter of the cone being made smaller. In this event the seal takes the appearance shown at 7 in the drawing. It has been found that such a seal may be made fully automatic by machine operation. Since the cylindrical portion does not constitute a widened portion at the apex portion of the cone with respect to the centre line of the cone, the latter may readily be removed from the mould. Moreover, the seal is only under strain of pressure, so that the risk of cracking is reduced.

What I claim is:

1. A method of manufacturing a cathode-ray tube, comprising the steps of molding a first glass tubular member to form a body having a conical portion and a cylindrical neck-line extension of given diameter at the apex portion of the cone, molding a second glass tubular member to form a body having a cylindrical portion and a radially-extending flange portion having an outer diameter slightly larger than said given diameter, disposing the first member in a vertical position with the cylindrical neck-like extension facing upwardly, placing the flange portion of the second member in abutting relationship and aligned with said cylindrical extension of said first member, and interfusing the said abutting portions.

2. A method as claimed in claim 1 in which the abutting portions are placed at right angles to one another.

References Cited in the file of this patent

UNITED STATES PATENTS

| | | |
|---|---|---|
| 2,151,840 | Dichter | Mar. 28, 1939 |
| 2,275,864 | Record | Mar. 10, 1942 |
| 2,296,307 | Power | Sept. 22, 1942 |